United States Patent
Wu

(10) Patent No.: US 10,261,325 B2
(45) Date of Patent: Apr. 16, 2019

(54) DISPLAY APPARATUS, WEARABLE APPARATUS, AND METHOD OF OPERATING THE DISPLAY APPARATUS

(71) Applicant: BOE TECHNOLOGY GROUP CO., LTD., Beijing (CN)

(72) Inventor: Naifu Wu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/741,736

(22) PCT Filed: Jun. 21, 2017

(86) PCT No.: PCT/CN2017/089294
§ 371 (c)(1),
(2) Date: Jan. 3, 2018

(87) PCT Pub. No.: WO2018/076727
PCT Pub. Date: May 3, 2018

(65) Prior Publication Data
US 2019/0086666 A1    Mar. 21, 2019

(30) Foreign Application Priority Data

Oct. 31, 2016  (CN) .......................... 2016 1 0931491

(51) Int. Cl.
*G02B 27/01*   (2006.01)
*G06T 19/00*   (2011.01)

(52) U.S. Cl.
CPC ..... *G02B 27/0172* (2013.01); *G02B 27/0176* (2013.01); *G06T 19/006* (2013.01); *G02B 2027/0178* (2013.01)

(58) Field of Classification Search
CPC combination set(s) only.
See application file for complete search history.

(56) References Cited

U.S. PATENT DOCUMENTS 9,244,275 B1 *  1/2016  Li ......................... G02B 5/0252
2003/0137524 A1  7/2003  Anabuki et al.
(Continued)

FOREIGN PATENT DOCUMENTS

CN    204595328 U    8/2015
CN    205003394 U    1/2016
(Continued)

OTHER PUBLICATIONS

International Search Report & Written Opinion dated Sep. 21, 2017, regarding PCT/CN2017/089294.

*Primary Examiner* — Robin J Mishler
(74) *Attorney, Agent, or Firm* — Intellectual Valley Law, P.C.

(57) ABSTRACT

The present application discloses a display apparatus. The display apparatus includes a display panel and an optical main body. The display apparatus has a first eyepiece side for viewing image on a first objective side of the display apparatus, and a second eyepiece side for viewing image on a second objective side of the display apparatus. The optical main body includes a first lens on a light emitting side of the display panel, and a transflective mirror between the first eyepiece side and the first objective side of the display apparatus and between the second eyepiece side and the second objective side of the display apparatus.

20 Claims, 4 Drawing Sheets

(56) References Cited

U.S. PATENT DOCUMENTS

| | | | |
|---|---|---|---|
| 2005/0285854 A1* | 12/2005 | Morita | G06F 3/016 |
| | | | 345/419 |
| 2016/0253843 A1* | 9/2016 | Lee | G06F 3/04815 |
| | | | 345/633 |
| 2016/0314624 A1* | 10/2016 | Li | G06F 1/163 |
| 2017/0108696 A1* | 4/2017 | Harrison | G02B 27/0172 |

FOREIGN PATENT DOCUMENTS

| | | |
|---|---|---|
| CN | 105807428 A | 7/2016 |
| CN | 105842863 A | 8/2016 |
| CN | 106444042 A | 2/2017 |
| CN | 206115040 U | 4/2017 |

* cited by examiner

DISPLAY APPARATUS, WEARABLE APPARATUS, AND METHOD OF OPERATING THE DISPLAY APPARATUS

CROSS-REFERENCE TO RELATED APPLICATION

This application is a national stage application under 35 U.S.C. § 371 of International Application No. PCT/CN2017/089294, filed Jun. 21, 2017, which claims priority to Chinese Patent Application No. 201610931491.0, filed Oct. 31, 2016, the contents of which are incorporated by reference in the entirety.

TECHNICAL FIELD

The present invention relates to display technology, more particularly, to a display apparatus, a wearable apparatus, and a method of operating a display apparatus.

BACKGROUND

Virtual reality and augmented reality are two computer technologies for viewing synthetic or partially synthetic environments. Virtual reality typically involves computer generated representations of various real-world or fictitious environments. Augmented reality typically involves various types of computer assisted representations of the real world.

SUMMARY

In one aspect, the present invention provides a display apparatus comprising a display panel; and an optical main body; wherein the display apparatus has a first eyepiece side for viewing image on a first objective side of the display apparatus, and a second eyepiece side for viewing image on a second objective side of the display apparatus, the first eyepiece side being different from the second eyepiece side, the first objective side being different from the second objective side; the optical main body comprises a first lens on a light emitting side of the display panel, the first lens is on the second eyepiece side of the display apparatus, the display panel is on the second objective side of the display apparatus; and a transflective mirror between the first eyepiece side and the first objective side of the display apparatus and between the second eyepiece side and the second objective side of the display apparatus, and configured to reflect a first portion of light emitted from the display panel to the first eyepiece side; allow a second portion of light emitted from the display panel to transmit through the transflective mirror to the first lens, and transmit through the first lens to the second eyepiece side of the display apparatus; and allow light from the first objective side of the display apparatus to transmit through the transflective mirror to the first eyepiece side of the display apparatus.

Optionally, the display apparatus further comprises a second lens and a third lens on a light emitting side of the display panel, the transflective mirror is between the second lens and the third lens, and the first lens is on a side of the second lens, the transflective mirror, and the third lens distal to the display panel; wherein the transflective mirror is configured to allow the second portion of light emitted from the display panel to transmit through the second lens, the transflective mirror, and the first lens.

Optionally, the transflective mirror is configured to allow the second portion of light emitted from the display panel to transmit through the second lens, the transflective mirror, the third lens, and the first lens.

Optionally, the second lens is on the first eyepiece side of the display apparatus and the third lens is on a first objective side of the display apparatus; and the first lens is on the second eyepiece side of the display apparatus and the display panel is on a second objective side of the display apparatus.

Optionally, the display panel has a first edge and a second edge; and a normal distance between a reflective surface of the transflective mirror and a light emitting surface of the display panel gradually decreases along the direction from the first edge to the second edge.

Optionally, the reflective surface is a concave surface concaved away from the display panel.

Optionally, the display panel has a first edge and a second edge; a thickness of the second lens gradually decreases along a direction from the first edge to the second edge; and a thickness of the third lens gradually decreases along a direction from the second edge to the first edge.

Optionally, a projection of the transflective mirror on a surface comprising a light emitting surface of the display panel substantially covers the light emitting surface.

Optionally, a projection of the transflective mirror on a surface substantially perpendicular to a light emitting surface of the display panel substantially covers that of the second lens.

Optionally, the transflective mirror is between the first lens and the display panel.

Optionally, the first lens is a convex lens configured to magnify image displayed on the display panel.

Optionally, a projection of the first lens on a surface comprising a light emitting surface of the display panel substantially covers the light emitting surface.

Optionally, the display apparatus further comprises a rotator connected to the optical main body and configured to rotate the optical main body.

Optionally, the rotator comprises a rotating shaft connected to the optical main body and configured to rotate the optical main body.

Optionally, a rotating axis of the rotating shaft is substantially parallel to the light emitting surface of the display panel.

Optionally, the rotator is configured to control the optical main body to switch between a first configuration and a second configuration; in the first configuration, the display apparatus is configured to allow a user to view the first portion of light emitted from the display panel and reflected by the transflective mirror to the first eyepiece side of the display apparatus and light from the first objective side of the display apparatus and transmitted through the transflective mirror to the first eyepiece side of the display apparatus; in the second configuration, the display apparatus is configured to allow a user to view the second portion of light emitted from the display panel and transmitted through the transflective mirror and the first lens to the second eyepiece side of the display apparatus.

In another aspect, the present invention provides a wearable apparatus comprising a display apparatus described herein.

Optionally, the wearable apparatus is a google or helmet.

In another aspect, the present invention provides a method of operating a display apparatus described herein, comprising controlling the display apparatus to be in a first configuration, in which the display apparatus is configured to allow a user to view the first portion of light emitted from the display panel and reflected by the transflective mirror to the first eyepiece side of the display apparatus and light from the first objective side of the display apparatus and transmitted through the transflective mirror to the first eyepiece side of the display apparatus; wherein an augmented reality image is displayed and observed from the first eyepiece side.

In another aspect, the present invention provides a method of operating a display apparatus described herein, comprising controlling the display apparatus to be in a second configuration, in which the display apparatus is configured to allow a user to view the second portion of light emitted from the display panel and transmitted through the transflective mirror and the first lens to the second eyepiece side of the display apparatus; wherein a virtual reality image is displayed and observed from the second eyepiece side.

BRIEF DESCRIPTION OF THE FIGURES

The following drawings are merely examples for illustrative purposes according to various disclosed embodiments and are not intended to limit the scope of the present invention.

DETAILED DESCRIPTION

Figure 1A:
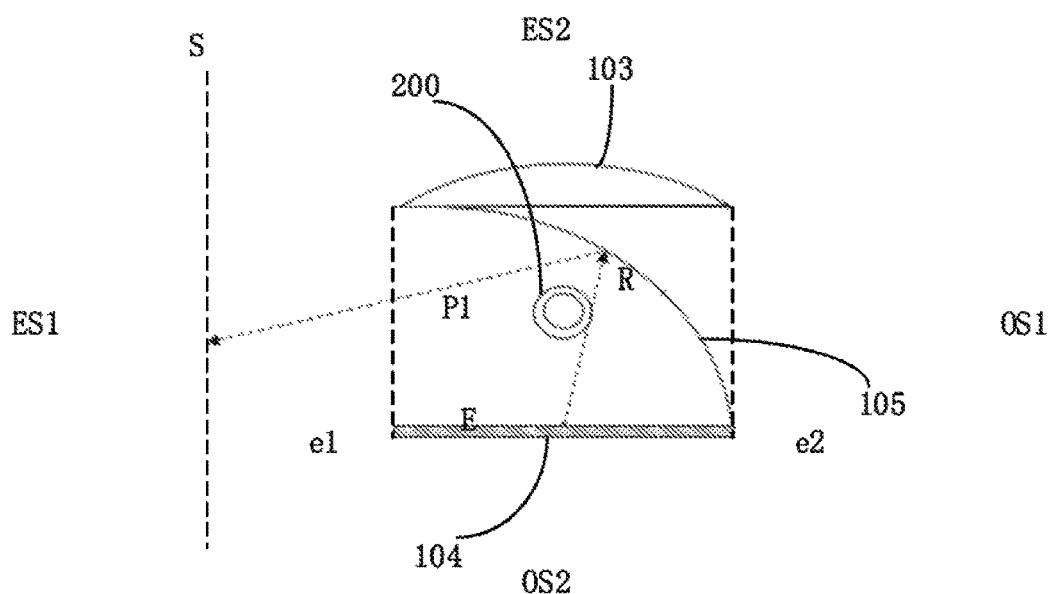
FIG. 1A is a schematic diagram illustrating the structure of a display apparatus in an augmented reality display mode in some embodiments according to the present disclosure.

The disclosure will now be described more specifically with reference to the following embodiments. It is to be noted that the following descriptions of some embodiments are presented herein for purpose of illustration and description only. It is not intended to be exhaustive or to be limited to the precise form disclosed.

Conventional augmented reality display technology and virtual reality display technology require designated apparatuses for respectively achieving augmented reality display and virtual reality display. A user who desires to experience a mixed reality has to repeatedly switch between an augmented reality display apparatus and a virtual reality display apparatus depending on different scenes. This requirement makes it extremely inconvenient for the user to experience the mixed reality environment.

Accordingly, the present disclosure provides, inter alia, a display apparatus, a wearable apparatus, and a method of operating a display apparatus that substantially obviate one or more of the problems due to limitations and disadvantages of the related art. In one aspect, the present disclosure provides a display apparatus. In some embodiments, the display apparatus includes a display panel and an optical main body. Optionally, the display apparatus has a first eyepiece side for viewing image on a first objective side of the display apparatus, and a second eyepiece side for viewing image on a second objective side of the display apparatus, the first eyepiece side being different from the second eyepiece side, the first objective side being different from the second objective side. The optical main body in some embodiments includes a first lens on a light emitting side of the display panel; and a transflective mirror between the first eyepiece side and the first objective side of the display apparatus and between the second eyepiece side and the second objective side of the display apparatus. The first lens is on the second eyepiece side of the display apparatus. The display panel is on the second objective side of the display apparatus. The transflective mirror in some embodiments is configured to reflect a first portion of light emitted from the display panel to the first eyepiece side; allow a second portion of light P2 emitted from the display panel to transmit through the transflective mirror to the first lens, and transmit through the first lens to the second eyepiece side of the display apparatus; and allow light from the first objective side of the display apparatus to transmit through the transflective mirror to the first eyepiece side of the display apparatus. The present display apparatus is configured to have an augmented reality display mode in which an augmented reality image is displayed and a virtual reality display mode in which a virtual reality image is displayed. The present display apparatus allows seamless switching between the augmented reality display mode and the virtual reality display mode, thereby enabling a mixed reality user experience.

As used herein, the term "augmented reality" refers to a live direct or indirect view of a physical, real-world environment whose elements are augmented (or supplemented) by computer-generated sensory input such as sound, video, graphics or GPS data. It is related to a more general concept called mediated reality, in which a view of reality is modified (possibly even diminished rather than augmented), by a computer. As used herein, the term "virtual reality" refers to a computer-simulated environment that can simulate physical presence in places in the real world or imagined worlds. Virtual reality could recreate sensory experiences, including virtual taste, sight, smell, sound, touch, and the like. Many traditional VR systems use a near eye display for presenting a 3D virtual environment. As used herein, the term "mixed reality" refers to a system that is able to combine real world data with virtual data. Mixed reality encompasses augmented reality and encompasses virtual reality that does not immerse its user 100% of the time in the virtual world. In a mixed reality environment, a real-world user can interact with synthetic objects integrated into a user's view of the real world. Optionally, the mixed reality has at least one real-world object and at least one virtual object, which a user of the mixed reality space can perceive as interacting with one another in some manner.

Figure 3A:
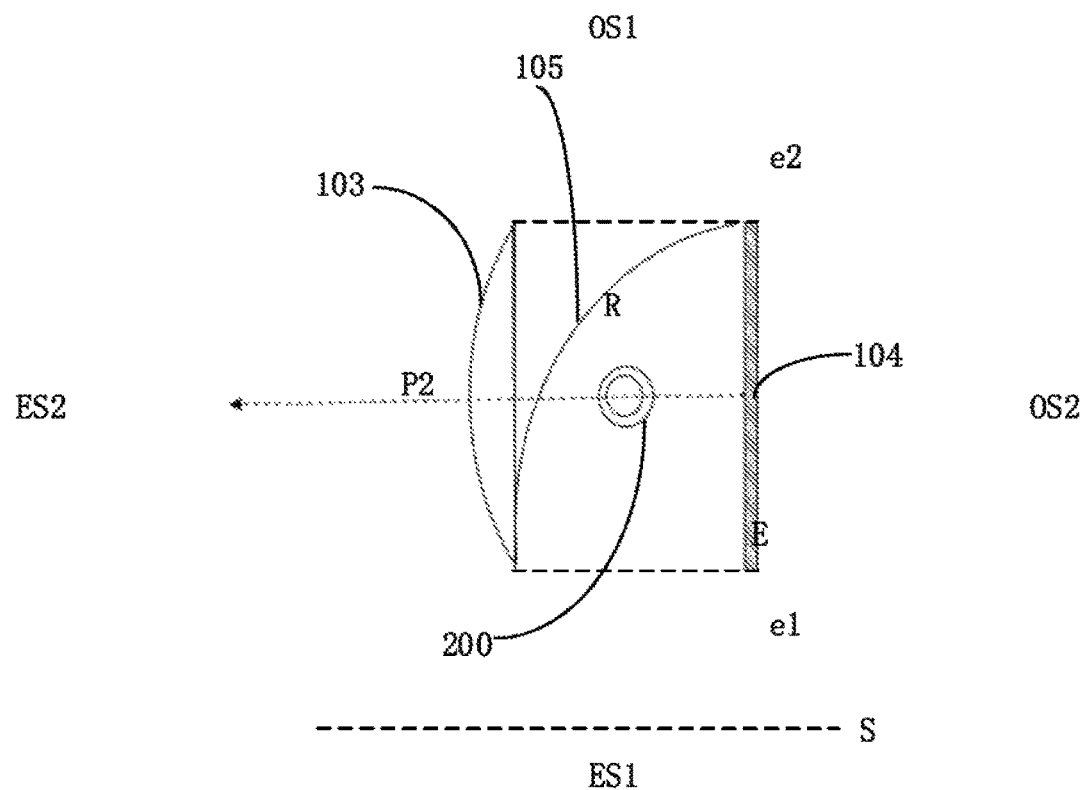
FIG. 3A is a schematic diagram illustrating the structure of a display apparatus in a virtual reality display mode in some embodiments according to the present disclosure.

FIG. 1A is a schematic diagram illustrating the structure of a display apparatus in an augmented reality display mode in some embodiments according to the present disclosure. FIG. 3A is a schematic diagram illustrating the structure of a display apparatus in a virtual reality display mode in some embodiments according to the present disclosure. Referring to FIG. 1A and FIG. 3A, the display apparatus in some embodiments includes a display panel 104 and an optical main body. The display panel 104 has a light emitting side E from which light for image display is emitted. The display apparatus has a first eyepiece side ES1 for viewing image on a first objective side OS1 of the display apparatus, and a second eyepiece side ES2 for viewing image on a second objective side OS2 of the display apparatus, the first eyepiece side ES1 being different from the second eyepiece side ES2, the first objective side OS1 being different from the second objective side OS2. The optical main body in some embodiments includes a first lens 103 on the light emitting side E of the display panel 104. The first lens 103 is on the second eyepiece side ES2 of the display apparatus. The display panel 104 is on the second objective side OS2 of the display apparatus. The optical main body in some embodiments further includes a transflective mirror 105 between the first eyepiece side ES1 and the first objective side OS1 of the display apparatus and between the second eyepiece side ES2 and the second objective side OS2 of the display apparatus. Optionally, the display panel 104 has a first edge e1 and a second edge e2. Optionally, the first eyepiece side ES1 is proximal to the first edge e1 and distal to the second edge e2, and the first objective side OS1 is proximal to the second edge e2 and distal to the first edge e1.

Optionally, the transflective mirror 105 is on the light emitting side E of the display panel 104. Optionally, a reflective surface R of the transflective mirror 105 is facing the first eyepiece side ES1 and the light emitting side E of the display panel 104. Optionally, the transflective mirror 105 is configured to reflect a first portion of light P1 emitted from the display panel 104 to the first eyepiece side ES1, as illustrated in FIG. 1A. Optionally, the transflective mirror 105 is configured to allow a second portion of light P2 emitted from the display panel 104 to transmit through the transflective mirror 105 to the first lens 103, and subsequently transmit through the first lens 103 to the second eyepiece side ES2 of the display apparatus, as illustrated in FIG. 3A. Optionally, the transflective mirror 105 is configured to allow light from the first objective side OS1 of the display apparatus to transmit through the transflective mirror 105 to the first eyepiece side ES1 of the display apparatus.

In some embodiments, the optical main body is configured to switch between a first configuration (FIG. 1A) and a second configuration (FIG. 3A). In the first configuration, the display apparatus is configured to allow a user to view (1) the first portion of light P1 emitted from the display panel 104 and reflected by the transflective mirror to the first eyepiece side ES1 of the display apparatus and (2) light from the first objective side OS1 of the display apparatus and transmitted through the transflective mirror 105 to the first eyepiece side ES1 of the display apparatus. In the second configuration, the display apparatus is configured to allow a user to view the second portion of light P2 emitted from the display panel 104 and transmitted through the transflective mirror 105 and the first lens 103 to the second eyepiece side ES2 of the display apparatus. In the first configuration, an observer from the first eyepiece side ES1 is observing an augmented image composed of an image of a reality scene transmitted from the first objective side OS1 and an image displayed on the display panel 104 reflected by the transflective mirror 105. In the second configuration, an observer from the second eyepiece side ES2 is observing a virtual reality image, e.g., the image displayed on the display panel 104. The display apparatus can be switched between the augmented reality display mode and the virtual reality display mode, thereby achieving a mixed reality experience depending on user needs.

Figure 1B:
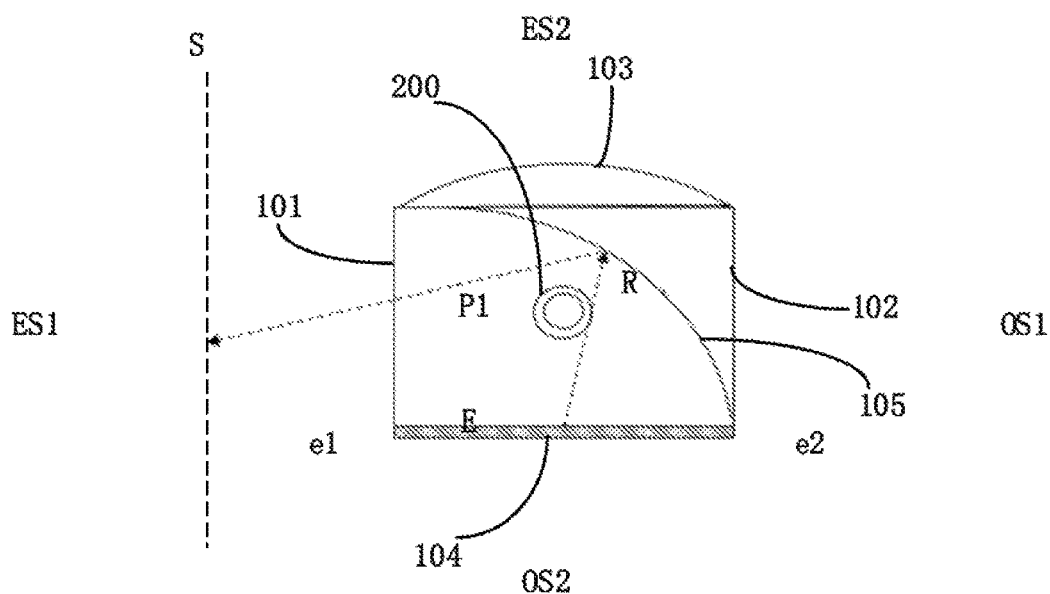
FIG. 1B is a schematic diagram illustrating the structure of a display apparatus in an augmented reality display mode in some embodiments according to the present disclosure.
Figure 3B:
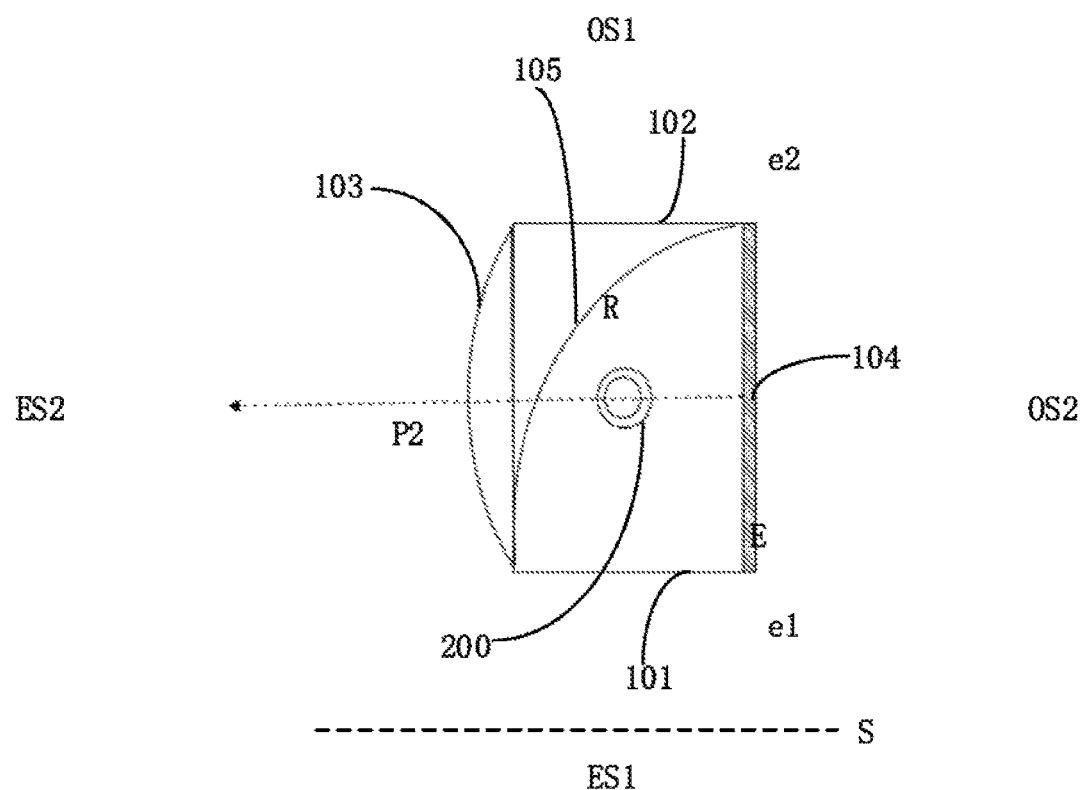
FIG. 3B is a schematic diagram illustrating the structure of a display apparatus in a virtual reality display mode in some embodiments according to the present disclosure.

FIG. 1B is a schematic diagram illustrating the structure of a display apparatus in an augmented reality display mode in some embodiments according to the present disclosure. FIG. 3B is a schematic diagram illustrating the structure of a display apparatus in a virtual reality display mode in some embodiments according to the present disclosure. Referring to FIG. 1B and FIG. 3B, the display apparatus in some embodiments includes a display panel 104 and an optical main body. The display panel 104 has a light emitting side E from which light for image display is emitted. The optical main body in some embodiments includes a second lens 101 and a third lens 102 on the light emitting side E of the display panel 104, a first lens 103 on a side of the second lens 101 and the third lens 102 distal to the display panel 104, and a transflective mirror 105 between the second lens 101 and the third lens 102. Optionally, the display panel 104 has a first edge e1 and a second edge e2. Optionally, the second lens 101 is disposed proximal to the first edge e1 and distal to the second edge e2, and the third lens 102 is disposed proximal to the second edge e2 and distal to the first edge e1.

Optionally, the transflective mirror 105 is on the light emitting side E of the display panel 104. Optionally, a reflective surface R of the transflective mirror 105 is facing the second lens 101 and the light emitting side E of the display panel 104. Optionally, the transflective mirror 105 is configured to reflect a first portion of light P1 emitted from the display panel 104 to the second lens 101, and subsequently transmit through the second lens 101, as illustrated in FIG. 1B. Optionally, the transflective mirror 105 is configured to allow a second portion of light P2 emitted from the display panel 104 to transmit through the transflective mirror 105 to the first lens 103, and subsequently transmit through the first lens 103, as illustrated in FIG. 3B. Optionally, the transflective mirror 105 is configured to allow the second portion of light P2 emitted from the display panel 104 to transmit through the second lens 101, the transflective mirror 105, and the first lens 103, as shown in FIG. 3B. Optionally, the transflective mirror 105 is configured to allow the second portion of light P2 emitted from the display panel 104 to transmit sequentially through the second lens 101, the transflective mirror 105, the third lens 102, and the first lens 103, as shown in FIG. 3B. Optionally, the transflective mirror 105 is configured to allow ambient light transmitted through the third lens 102 to transmit through the transflective mirror 105 to the second lens 101, and subsequently transmit through the second lens 101.

In some embodiments, the optical main body is configured to switch between a first configuration (FIG. 1B) and a second configuration (FIG. 3B). In the first configuration, the second lens 101 is on a first eyepiece side ES1 of the display apparatus and the third lens 102 is on a first objective side OS1 of the display apparatus. In the second configuration, the first lens 103 is on a second eyepiece side ES2 of the display apparatus and the display panel 104 is on a second objective side OS2 of the display apparatus. In the first configuration, an observer from the first eyepiece side ES1 is observing an augmented image composed of an image of a reality scene transmitted through the third lens 102 and an image displayed on the display panel 104 reflected by the transflective mirror 105. In the second configuration, an observer from the second eyepiece side ES2 is observing a virtual reality image, e.g., the image displayed on the display panel 104. The display apparatus can be switched between the augmented reality display mode and the virtual reality display mode, thereby achieving a mixed reality experience depending on user needs.

In some embodiments, the display apparatus further includes a rotator 200 (e.g., a rotating shaft as shown in FIGS. 1A, 1B, 3A, and 3B) connected to the optical main body and configured to rotate the optical main body. Optionally, the rotator 200 is a rotating shift. Optionally, the rotator 200 is configured to control the optical main body to switch between the first configuration and the second configuration, thereby switching the display apparatus between the augmented reality display mode and the virtual reality display mode.

In one example, the rotator 200 is configured to rotate the optical main body to a first orientation in a first angle range (e.g., rotating the optical main body along a first rotating direction for a first pre-set angle), thereby setting the optical main body in the first configuration. Optionally, in the first configuration, the second lens 101 is on the first eyepiece side ES1 of the display apparatus and the third lens 102 is on the first objective side OS1 of the display apparatus. An observer can observe an augmented reality image from the first eyepiece side ES1.

In another example, the rotator 200 is configured to rotate the optical main body to a second orientation in a second angle range (e.g., rotating the optical main body along a second rotating direction opposite to the first rotating direction for a second pre-set angle), thereby setting the optical main body in the second configuration. Optionally, in the second configuration, the first lens 103 is on the second eyepiece side ES2 of the display apparatus and the display panel 104 is on the second objective side OS2 of the display apparatus. An observer can observe a virtual reality image from the second eyepiece side ES2.

Figure 2:
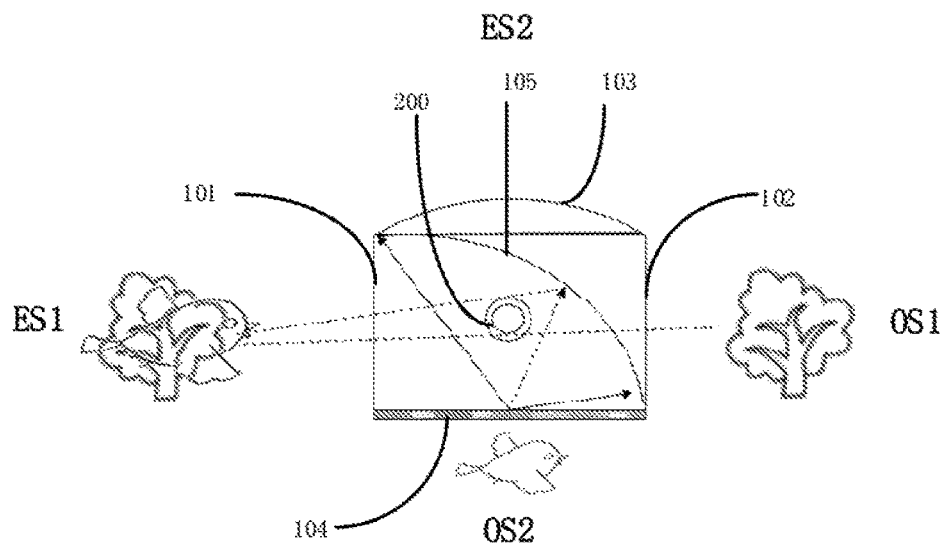
FIG. 2 is a schematic diagram illustrating the working principle of a display apparatus in an augmented reality display mode in some embodiments according to the present disclosure.

FIG. 2 is a schematic diagram illustrating the working principle of a display apparatus in an augmented reality display mode in some embodiments according to the present disclosure. Referring to FIG. 2, the display apparatus is in the first configuration and in the augmented reality display mode, and the observer is viewing the image from the first eyepiece side ES1 of the display apparatus. In the augmented reality display mode, the observer is observing a reality scene (e.g., a tree) transmitted from the first objective side OS1 (e.g., through the third lens 102) and an image (e.g., a bird) from the second objective side OS2 (e.g., an image displayed on the display panel 104 and reflected by the transflective mirror 105 to the observer's eyes). In the first configuration, the observer is observing a merged scene composed of the reality scene (the tree) and the virtual scene (the bird), thereby achieving augmented reality display effects.

Figure 4:
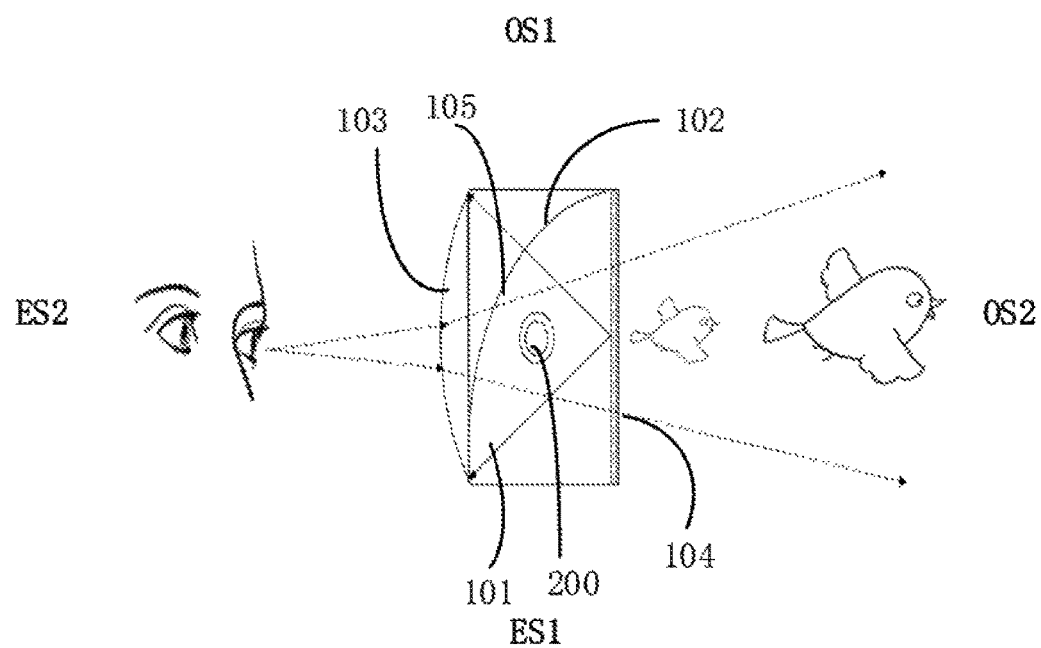
FIG. 4 is a schematic diagram illustrating the working principle of a display apparatus in a virtual reality display mode in some embodiments according to the present disclosure.

FIG. 4 is a schematic diagram illustrating the working principle of a display apparatus in a virtual reality display mode in some embodiments according to the present disclosure. Referring to FIG. 4, the display apparatus is in the second configuration and in the virtual reality display mode, and the observer is viewing the image from the second eyepiece side ES2 of the display apparatus. In the virtual reality display mode, the observer is observing the image displayed on the display panel 104, thereby achieving virtual reality display effects.

The transflective mirror 105 is semi-transmissive and semi-reflective. Thus, a portion (e.g., the second portion P2) of light emitted from the display panel 104 transmits through the transflective mirror 105, and the light intensity reaches the observer's eyes is reduced. Optionally, in the first configuration and the augmented reality display mode, the light intensity of a back light of the display panel 104 is increased to enhance the image display brightness.

Using the present display apparatus, a user can freely switch between the augmented reality display mode and the virtual reality display mode, thereby achieving a mixed reality viewing experience. Thus, the user can obtain a variety of interactive sensory experience using a single apparatus.

An appropriate display panels may be used in the present display apparatus. Examples of appropriate display panels include a liquid crystal display panel and an organic light emitting diode display panel.

In some embodiments, and as illustrated in FIGS. 1A, 1B, 3A, and 3B, the display panel has a first edge e1 and a second edge e2. Optionally, a thickness of the second lens 101 gradually decreases along a direction from the first edge e1 to the second edge e2. Optionally, a thickness of the third lens 102 gradually decreases along a direction from the second edge e2 to the first edge e1. Optionally, a normal distance between a reflective surface R of the transflective mirror 105 and a light emitting surface E of the display panel 104 gradually decreases along the direction from the first edge e1 to the second edge e2. The reflective surface R of the transflective mirror 105 is gradually closer to the light emitting surface E of the display panel 104 from a first edge of the transflective mirror 105 proximal to the first edge e1 to a second edge of the transflective mirror 105 proximal to the second edge e2.

By having the transflective mirror 105 inclinedly disposed on the light emitting side E of the display panel 104, the reflective surface R of the transflective mirror 105 faces toward both the first eyepiece side ES1 (e.g., the second lens 101) and the light emitting surface E of the display panel 104. Accordingly, a first portion of light P1 emitted from the display panel 104 can be reflected by the transflective mirror 105 toward the first eyepiece side ES1 (e.g., to the second lens 101, and subsequently transmit through the second lens 101). A second portion of light P2 emitted from the display panel 104 can transmit through the transflective mirror 105 toward the second eyepiece side ES2 (e.g., to the first lens 103, and subsequently transmit through the first lens 103). Moreover, the light from the first objective side OS1 (e.g., light transmitted through the third lens 102) can transmit through the transflective mirror 105 toward the first eyepiece side ES1 (e.g., to the second lens 101, and subsequently transmit through the second lens 101). In the first configuration (FIG. 1A and FIG. 1B), the first portion of light P1 emitted from the display panel 104 can be reflected by the transflective mirror 105 toward the first eyepiece side ES1 (e.g., to the second lens 101, and subsequently transmit through the second lens 101), and the light from the first objective side OS1 (e.g., light transmitted through the third lens 102) can transmit through the transflective mirror 105 toward the first eyepiece side ES1 (e.g., to the second lens 101, and subsequently transmit through the first lens 101), thereby achieving the augmented reality display. In the second configuration (FIG. 3), the second portion of light P2 emitted from the display panel 104 can transmit through the transflective mirror 105 to the first lens 103, and subsequently transmit through the first lens 103, thereby achieving the virtual reality display.

The first configuration and the second configuration of the display apparatus can be set by the rotator 200, as illustrated in FIGS. 1A, 1B, 2, 3A, 3B, and 4. Any appropriate mechanisms may be used to set the first configuration and the second configuration of the display apparatus. For example, the display apparatus in some embodiments is a smart google having a frame attached to the display apparatus. The display configurations of display apparatus can be achieved by moving the frame of the smart google to different positions of the display apparatus (e.g., moving to different grooves of the display apparatus), thereby allowing the user wearing the smart google to view image in the augmented reality display mode or in the virtual reality display mode.

In some embodiments, the transflective mirror 105 has a concave structure concaved away from the display panel 104 (convex toward the third lens 102 and the first lens 103). Optionally, the reflective surface R is a concave surface concaved away from the display panel 104. Optionally, a middle portion of the transflective mirror 105 has a concave surface concaved away from the display panel 104.

In some embodiments, and as illustrated in FIGS. 1A, 1B, 2, 3A, 3B, and 4, a projection of the transflective mirror 105 on a surface containing a light emitting surface E of the display panel 104 substantially covers the light emitting surface E. Optionally, the projection of the transflective mirror 105 on the surface containing a light emitting surface E of the display panel 104 completely covers, and is larger than, the light emitting surface E. In some embodiments, and as illustrated in FIGS. 1A, 1B, 2, 3A, 3B, and 4, a projection of the transflective mirror 105 on a surface S substantially perpendicular to a light emitting surface E of the display panel 104 substantially covers that of the second lens 101. Optionally, the projection of the transflective mirror 105 on a surface S substantially perpendicular to a light emitting surface E of the display panel 104 completely covers, and is larger than, that of the second lens 101. By having this design, images displayed on substantially the entire display surface of the display panel 104 can be reflected to the observer's eyes by the transflective mirror 105 in the first configuration.

In some embodiments, the transflective mirror 105 is between the first lens 103 and the display panel 104. Optionally, the first lens 103 and the display panel 104 are opposite to each other. Optionally, the display panel 104, the first lens 103, and additional peripheral structure (e.g., the dotted line depicted in FIG. 1A and FIG. 3A) form a frame structure for receiving the transflective mirror 105. Optionally, the second lens 101 and the third lens 102 are opposite to each other, the first lens 103 and the display panel 104 are opposite to each other. The second lens 101, the display panel 104, the third lens 102, and the first lens 103 form a frame structure for receiving the transflective mirror 105. By having this design, the display apparatus has a compact and simplified structure.

In some embodiments, the first lens 103 is between the transflective mirror 105 and the display panel 104.

In some embodiments, the first lens 103 is a convex lens configured to magnify image displayed on the display panel 104. The display panel 104 in some embodiments has a relatively smaller size, e.g., less than 50 cm, less than 40 cm, less than 30 cm, less than 20 cm, less than 10 cm, or less than 5 cm, in width or length. By having a magnifying convex lens as the first lens 103, the image displayed on the display panel 104 can be magnified. The magnification ratio of the first lens 103 can be determined based on design needs.

In some embodiments, a projection of the first lens 103 on a surface containing a light emitting surface E of the display panel 104 substantially covers the light emitting surface E. Optionally, the projection of the first lens 103 on the surface containing a light emitting surface E of the display panel 104 completely covers, and is larger than, the light emitting surface E. By having this design, images displayed on substantially the entire display surface of the display panel 104 can be observed by the observer's eyes in the second configuration.

In some embodiments, the rotator 200 includes one or more rotating shafts. Optionally, a rotating axis of the rotating shaft is substantially parallel to the light emitting surface E of the display panel 104. In one example, the display panel 104 includes a first edge e1, a second edge e2, a third edge connected the first edge e1 and the second edge e2, and a fourth edge connected the first edge e1 and the second edge e2. Optionally, the first edge e1 and the second edge e2 are opposite to each other, and the third edge and the fourth edge are opposite to each other. Optionally, the second lens 101 is on a side proximal to the first edge e1, and the third lens 102 is on a side proximal to the second edge e2. Optionally, the display apparatus further includes a support on the third edge (or alternatively on the fourth edge). The rotating shaft is connected to the optical main body through the support.

By having a support for connecting the rotating shaft to the optical main body, the display apparatus can be switched between the first configuration and the second configuration seamlessly. The rotating shaft is anchored onto the support, rather than extending through the optical main body, thus would not interfere with the light transmission within the optical main body.

Figure 5:
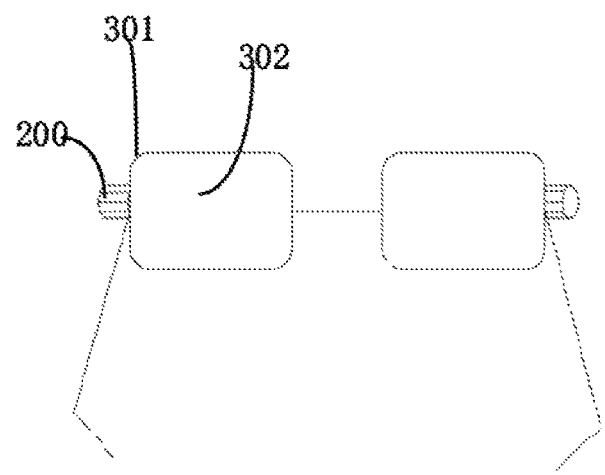
FIG. 5 is a schematic diagram illustrating a wearable apparatus in some embodiments according to the present disclosure.

In another aspect, the present disclosure provides a wearable apparatus having the display apparatus described herein. FIG. 5 is a schematic diagram illustrating a wearable apparatus in some embodiments according to the present disclosure. Referring to FIG. 5, the wearable apparatus in some embodiments is a smart google. The smart google in FIG. 5 includes a lens portion 302 and a frame portion 301. The optical main body and the display panel 104 can be integrated into the lens portion 302. The rotator 200 (e.g., a rotating shaft) can be integrated into the frame portion 301.

Optionally, the wearable apparatus is a smart helmet.

In another aspect, the present disclosure provides a method of operating a display apparatus. In some embodiments, the method includes controlling the display apparatus to be in a first configuration, in which the display apparatus is configured to allow a user to view the first portion of light emitted from the display panel and reflected by the transflective mirror to the first eyepiece side of the display apparatus and light from the first objective side of the display apparatus and transmitted through the transflective mirror to the first eyepiece side of the display apparatus. Optionally, in the first configuration, the second lens is on a first eyepiece side of the display apparatus and the third lens is on a first objective side of the display apparatus. Optionally, an augmented reality image is displayed and observed from the first eyepiece side. In some embodiments, the method includes controlling the display apparatus to be in a second configuration, in which the display apparatus is configured to allow a user to view the second portion of light emitted from the display panel and transmitted through the transflective mirror and the first lens to the second eyepiece side of the display apparatus. Optionally, in the second configuration, the first lens is on a second eyepiece side of the display apparatus and the display panel is on a second objective side of the display apparatus. Optionally, a virtual reality image is displayed and observed from the second eyepiece side.

In another aspect, the present disclosure provides a method of operating a wearable apparatus. In some embodiments, the method includes rotating the optical main body to a first orientation in a first angle range (e.g., rotating the optical main body along a first rotating direction for a first pre-set angle), thereby setting the optical main body in the first configuration. Optionally, in the first configuration, the second lens is on the first eyepiece side of the display apparatus and the third lens is on the first objective side of the display apparatus. An observer can observe an augmented reality image from the first eyepiece side. In some embodiments, the method includes rotating the optical main body to a second orientation in a second angle range (e.g., rotating the optical main body along a second rotating direction opposite to the first rotating direction for a second pre-set angle), thereby setting the optical main body in the second configuration. Optionally, in the second configuration, the first lens is on the second eyepiece side of the display apparatus and the display panel is on the second objective side of the display apparatus. An observer can observe a virtual reality image from the second eyepiece side.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A display apparatus, comprising:
a display panel; and
an optical main body;
wherein the display apparatus has a first eyepiece side for viewing image on a first objective side of the display apparatus, and a second eyepiece side for viewing image on a second objective side of the display apparatus, the first eyepiece side being different from the second eyepiece side, the first objective side being different from the second objective side;
the optical main body comprises:
a first lens on a light emitting side of the display panel, the first lens is on the second eyepiece side of the display apparatus, the display panel is on the second objective side of the display apparatus; and
a transflective mirror between the first eyepiece side and the first objective side of the display apparatus and between the second eyepiece side and the second objective side of the display apparatus, and configured to:
reflect a first portion of light emitted from the display panel to the first eyepiece side;
allow a second portion of light emitted from the display panel to transmit through the transflective mirror to the first lens, and transmit through the first lens to the second eyepiece side of the display apparatus; and
allow light from the first objective side of the display apparatus to transmit through the transflective mirror to the first eyepiece side of the display apparatus.

2. The display apparatus of claim 1, further comprising a second lens and a third lens on a light emitting side of the display panel, the transflective mirror is between the second lens and the third lens, and the first lens is on a side of the second lens, the transflective mirror, and the third lens distal to the display panel;
wherein the transflective mirror is configured to allow the second portion of light emitted from the display panel to transmit through the second lens, the transflective mirror, and the first lens.

3. The display apparatus of claim 2, wherein the transflective mirror is configured to allow the second portion of light emitted from the display panel to transmit through the second lens, the transflective mirror, the third lens, and the first lens.

4. The display apparatus of claim 2, wherein
the second lens is on the first eyepiece side of the display apparatus and the third lens is on a first objective side of the display apparatus; and
the first lens is on the second eyepiece side of the display apparatus and the display panel is on a second objective side of the display apparatus.

5. The display apparatus of claim 1, wherein the display panel has a first edge and a second edge; and a normal distance between a reflective surface of the transflective mirror and a light emitting surface of the display panel gradually decreases along the direction from the first edge to the second edge.

6. The display apparatus of claim 5, wherein the reflective surface is a concave surface concaved away from the display panel.

7. The display apparatus of claim 2, wherein the display panel has a first edge and a second edge;
a thickness of the second lens gradually decreases along a direction from the first edge to the second edge; and
a thickness of the third lens gradually decreases along a direction from the second edge to the first edge.

8. The display apparatus of claim 1, wherein a projection of the transflective mirror on a surface comprising a light emitting surface of the display panel substantially covers the light emitting surface.

9. The display apparatus of claim 2, wherein a projection of the transflective mirror on a surface substantially perpendicular to a light emitting surface of the display panel substantially covers that of the second lens.

10. The display apparatus of claim 1, wherein the transflective mirror is between the first lens and the display panel.

11. The display apparatus of claim 1, wherein the first lens is a convex lens configured to magnify image displayed on the display panel.

12. The display apparatus of claim 1, wherein a projection of the first lens on a surface comprising a light emitting surface of the display panel substantially covers the light emitting surface.

13. The display apparatus of claim 1, further comprising a rotator connected to the optical main body and configured to rotate the optical main body.

14. The display apparatus of claim 13, wherein the rotator comprises a rotating shaft connected to the optical main body and configured to rotate the optical main body.

15. The display apparatus of claim 14, wherein a rotating axis of the rotating shaft is substantially parallel to the light emitting surface of the display panel.

16. The display apparatus of claim 13, wherein the rotator is configured to control the optical main body to switch between a first configuration and a second configuration;
- in the first configuration, the display apparatus is configured to allow a user to view the first portion of light emitted from the display panel and reflected by the transflective mirror to the first eyepiece side of the display apparatus and light from the first objective side of the display apparatus and transmitted through the transflective mirror to the first eyepiece side of the display apparatus;
- in the second configuration, the display apparatus is configured to allow a user to view the second portion of light emitted from the display panel and transmitted through the transflective mirror and the first lens to the second eyepiece side of the display apparatus.

17. A wearable apparatus, comprising a display apparatus of claim 1.

18. The wearable apparatus of claim 17, wherein the wearable apparatus is a google or helmet.

19. A method of operating a display apparatus of claim 1, comprising:
- controlling the display apparatus to be in a first configuration, in which the display apparatus is configured to allow a user to view the first portion of light emitted from the display panel and reflected by the transflective mirror to the first eyepiece side of the display apparatus and light from the first objective side of the display apparatus and transmitted through the transflective mirror to the first eyepiece side of the display apparatus;
- wherein an augmented reality image is displayed and observed from the first eyepiece side.

20. A method of operating a display apparatus of claim 1, comprising:
- controlling the display apparatus to be in a second configuration, in which the display apparatus is configured to allow a user to view the second portion of light emitted from the display panel and transmitted through the transflective mirror and the first lens to the second eyepiece side of the display apparatus;
- wherein a virtual reality image is displayed and observed from the second eyepiece side.

* * * * *